United States Patent Office 3,135,018
Patented June 2, 1964

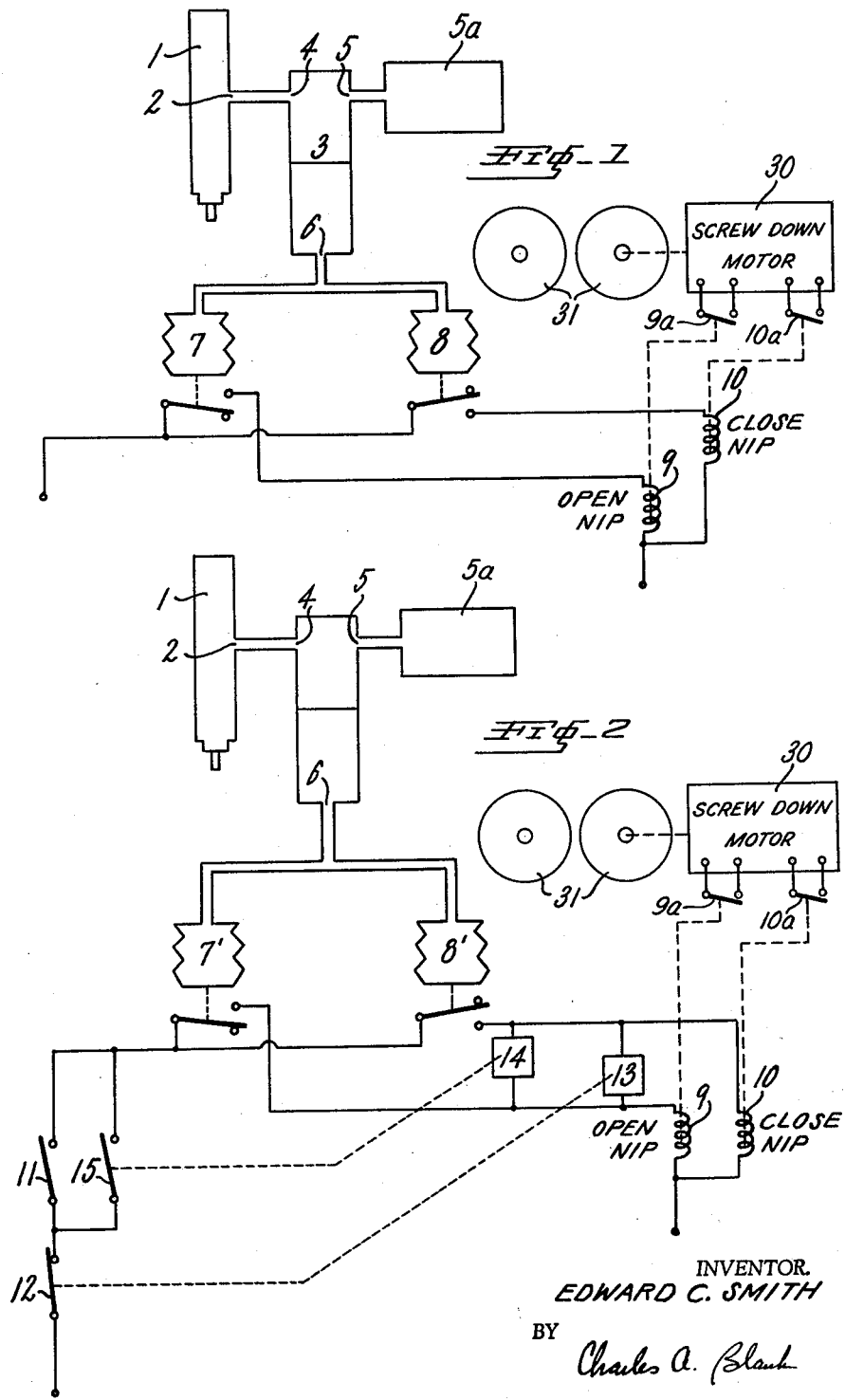

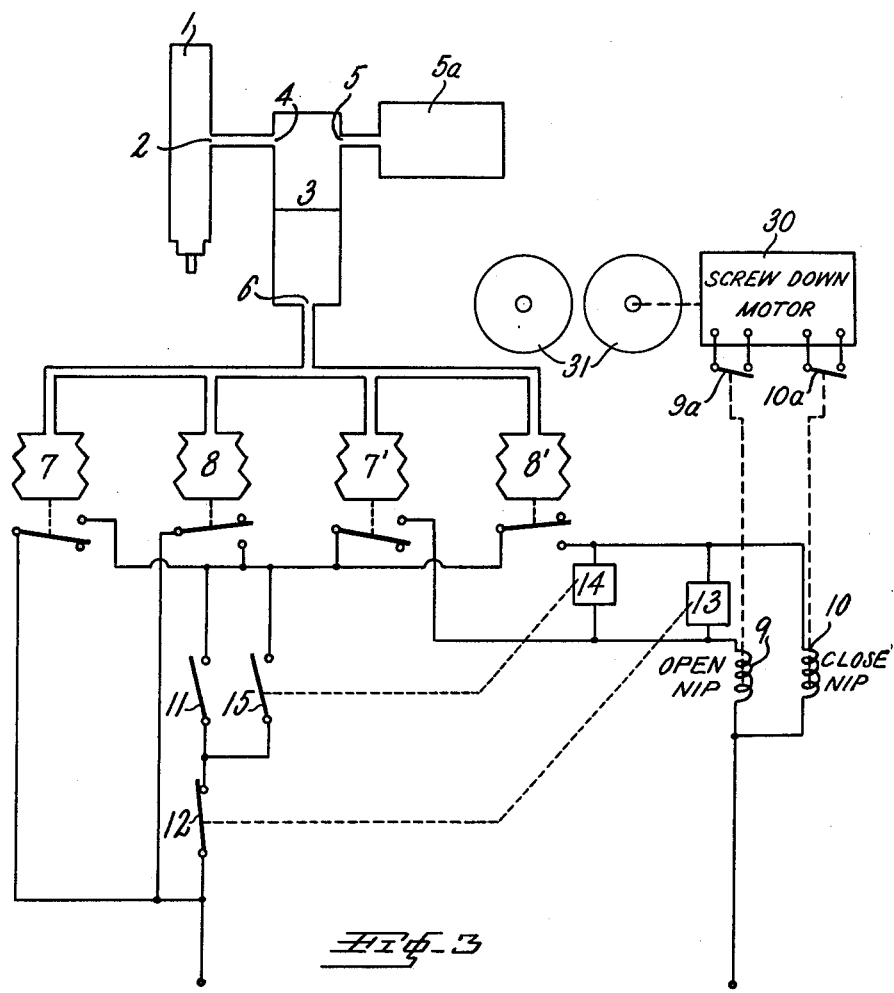

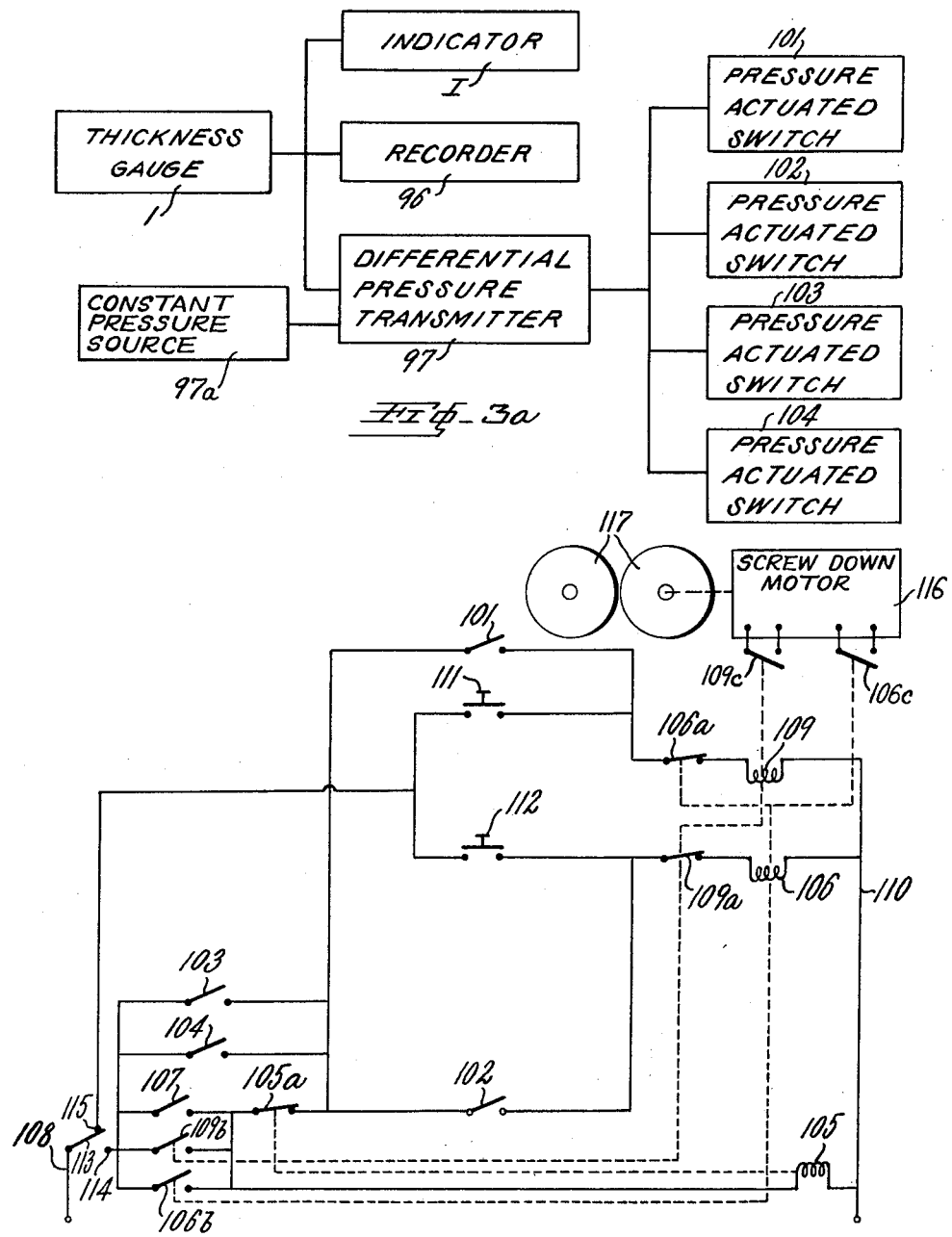

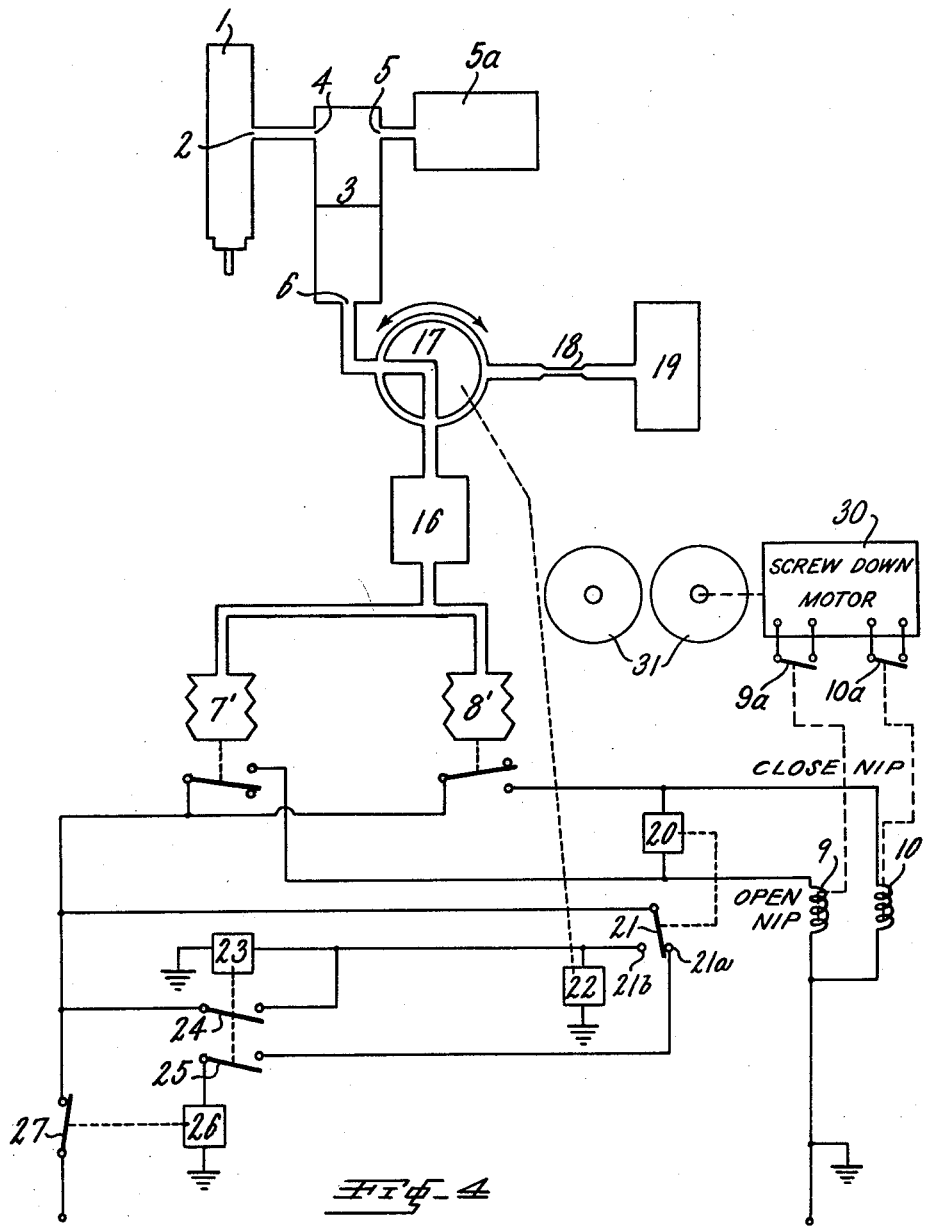

3,135,018
CONTROL APPARATUS
Edward C. Smith, Ramsey, N.J., assignor to United States Rubber Company, New York, N.Y., a corporation of New Jersey
Filed Oct. 24, 1961, Ser. No. 147,364
3 Claims. (Cl. 18—2)

This invention relates to a method and means for automatically controlling a dimension of a shaped material which is produced in continuous lengths. For example, the invention may be embodied in apparatus for automatically controlling the thickness, gauge, diameter, wall thickness, or the like of a sheet, rod, tube, or other shape of a plastic material, including rubber, which is produced by a calender, tuber, extruder, spreader, or the like.

This application is a continuation-in-part of my United States patent application, Serial Number 811,397, filed May 6, 1959, and entitled "Servomechanism," now Patent No. 3,088,061.

Many manufacturing operations involve the formation of continuous lengths of materials, in the form of a uniform sheet or other shape. Such operations are especially frequent in the rubber and plastics industry. Examples are the calendering of sheeting, coated fabrics, tire treads, sole stocks, etc.; the extrusion of these shapes and of rods and tubes; and the spreading on a moving surface of a layer of viscous fluid, solution, or dispersion which is subsesquently dried or otherwise treated to form a solid sheet. In such operations, it is highly important to be able to quickly adjust the machine to give the dimensions desired in the product, and to maintain the adjustment within the closest possible tolerances. Poor control results in waste of material, through scrap production and the necessity for excessively broad dimensional tolerances. It results in unproductive labor and machine time during periods of adjustment; and it frequently adversely affects product quality, due to non-uniformity. Much work has been done to devise instruments, mechanisms, and methods for continuously measuring a dimension (e.g. the thickness) of the product in such a process, and for automatically adjusting the machine to correct for deviations in dimension. The results hitherto obtained have not been entirely satisfactory.

It is an object of the present invention, therefore, to provide a new and improved method and means for automatically controlling the gauge of calendered stock, extruded shapes, spread sheets and the like, which are greatly superior to those previously known.

In the description of my invention which follows, its application to the process of calendering a sheet of rubber or plastic will be explained and discussed. It will be apparent that the invention is not limited to this particular application, but has a scope as set forth elsewhere in the specification and in the claims.

In accordance with a particular form of the invention, apparatus for automatically controlling a dimension of a plastic material produced in continuous lengths comprises gauging means for developing a pneumatic pressure representative of the dimension of the material and means for supplying a pneumatic pressure representative of the desired value of the aforesaid dimension. The apparatus includes a differential pressure transmitter actuated by the aforesaid pressures for developing an output pressure representative of the deviation of value of the aforesaid dimension from the desired value. The apparatus also includes means responsive to the output pressure of the differential pressure transmitter for effecting an adjustment of the aforesaid dimension of the material to the desired value.

In preferred forms of the invention (as illustrated e.g. in FIGURES 2 and 3), the pneumatic and electrical circuits are adapted to energize the calender roll adjusting mechanism at determinate time intervals for a predetermined length of time, the time interval between adjustments being long enough to ensure the completion of one correction and the sensing of the corrected stock thickness by the measuring instrument before the next correction cycle is started, and the duration or extent of the adjustment being such as to bring the stock gauge within the predetermined tolerance limits.

In still other preferred forms of the invention (as illustrated e.g. in FIGURE 4), the pneumatic and electrical circuits are adapted to effect in each such correction cycle a change in calender roll separation proportional to the gauge deviation at the start of the cycle.

The gauge for measuring the thickness of the stock may be any gauge which furnishes, or can be adapted to furnish, an output signal in the form of a pneumatic pressure representative of the thickness of the stock. It is desirable that the gauge have high sensitivity, accuracy, speed of response, and dependability, since obviously the quality of control obtained depends directly upon these characteristics of the gauge. It is also desirable that the gauge be capable of being mounted to measure the stock thickness at a point close to the nip of the calender rolls, since the lag between the occurrence of a thickness deviation at the nip and its detection by the gauge and subsequent correction is greater, the farther the gauge is from the nip. A very suitable gauge, used in the embodiments of the invention described hereinafter, is described in my U.S. patent application Serial No. 811,397, filed May 6, 1959, now Patent No. 3,088,061, which is hereby incorporated in the present application by reference. Any other suitable gauge may be used in the invention.

The calender, and its associated mechanism for adjusting the roll spacing or nip, are conventional. The nip-adjusting mechanism, or screw-down motor, as it is commonly called, typically comprises a reversible electric motor driving one or more movable calender roll bearings through a suitable speed-reduction mechanism. To obtain the advantages of the present invention in accuracy and dependability of gauge control in the highest degree, the calender should be well designed and constructed, and as free as possible from defects such as roll eccentricity, roll distortion under load, loose bearings, etc. The nip-adjusting mechanism should also be of high quality, with low lag in starting and stopping, constant operating speed, and freedom from back-lash. However, the invention is highly effective in rapidly correcting deviations in gauge due to deficiencies in the calender, to the extent that this is possible.

The pneumatic pressure output signal of the thickness gauge is representative of the gauge of the stock, and in principle could be used directly to actuate the pressure-operated switches in the control circuit as described hereinafter. However, in practice the variations in this pressure with the stock gauge are usually too small to provide accurate control, and I prefer to amplify the signal. This is conveniently done by a differential pressure transmitter of conventional construction, for example, that furnished by Moore Products Co., Philadelphia 24, Pennsylvania, and described in their Bulletin 1102, copyright 1955. The pneumatic pressure output from the calender gauge, representative of the actual gauge of the sheet of stock at the point of measurement, is supplied to one of two input ports of the differential pressure transmitter. The other input port is supplied from an outside source with a pressure representative of the desired gauge of the sheet. The output pressure of the differential pressure transmitter then is representative of the difference between the two input pressures, that is, of the deviation of the actual stock gauge from the desired gauge. Using the above mentioned calender gauge and differential pressure transmitter, the output pressure of the differential pressure transmitter will have a definite value when the stock gauge is correct. With negative gauge deviations the output pressure will be higher and with positive deviations it will be lower than this definite value. Thus the output pressure of the differential pressure transmitter is a measure of the direction and extent of the stock gauge deviation.

It will be evident that the operation of the control of my invention does not depend upon the use of the particular differential pressure transmitter used in the examples. Any similar differential pressure transmitter capable of delivering an output pressure of suitable magnitude and range, which varies with and is a measure of the direction and extent of deviations of the stock gauge, may be used.

The pressure-operated switches used in my invention are of two kinds: a "normally open" switch which is open at pressures below its set point, and closed at pressures above the set point; and a "normally closed" switch which is closed at pressures below its set point, and open at pressures above the set point. The accuracy and reliability of the switches should be high, and their sensitivity should be such that they open and close within a pressure range corresponding to not more than about 0.1–0.2 mil variation in stock gauge. This will make possible the control of the stock gauge within tolerance limits of plus or minus 0.25 to 1.0 mil, under suitably good operating conditions (i.e. well-designed calender and nip-adjusting mechanisms, a stock with fairly uniform plastic properties; and a distance of 1–10 feet between the calender roll nip and the measuring point of the gauge). Preferably the set point of the switch should be adjustable, to facilitate changing gauge tolerances. In the embodiments of my invention described hereinafter, switches having the following characteristics were found satisfactory: Spring-loaded bellows type, calibrated range of set point 5–10 p.s.i., on-off pressure differential 2 inches of water (0.07 p.s.i.). Such switches may be obtained from United Electric Controls Co., Watertown, Mass. Other pressure operated switches having the desired characteristics may be used.

Referring now to the drawings:

FIG. 1 is a schematic diagram of a control system constructed in accordance with the invention;

FIG. 2 is a schematic diagram of a control system constructed in accordance with another form of the invention;

FIG. 3 is a schematic diagram of a control system combining the features of the FIG. 1 and FIG. 2 systems;

FIG. 3a is a schematic diagram of a modified control system, similar to the FIG. 3 system;

FIG. 3b is a circuit diagram of a portion of the FIG. 3a system; and

FIG. 4 is a schematic diagram of a control system constructed in accordance with another form of the invention.

FIG. 1 shows schematically a relatively simple arrangement for continuous automatic control of gauge of a calendered sheet. A calender gauge 1 continuously measures the gauge of a sheet of stock (not shown) issuing from a calender, and supplies at its output port 2 a pneumatic pressure representative of the gauge of the sheet. The calender gauge output pressure is imposed on the differential pressure transmitter 3 at its input port 4. A pressure, respresentative of the desired stock gauge, from a suitable source 5a is imposed on the differential pressure transmitter 3 at a second input port 5. The output pressure of 3 at output port 6, representative of the direction and extent of the stock gauge deviation, is supplied to normally open pressure-operated switch 7 and normally closed pressure-operated switch 8, which control the current supply in low-impedance solenoids 9 and 10 respectively. These switches are set to operate at pressures such that both switches are open, and the calender nip adjusting mechanism is not energized, when the stock gauge, as measured by the calender gauge 1, is within a range of deviation ±D from the desired gauge. With positive deviations of stock gauge greater than +D (corresponding to a relatively low output pressure at 6), switch 8 closes to energize solenoid 10 and thereby close switch 10a, energizing the screw-down motor 30 to close the nip of calender rolls 31; switch 7 remains open. With negative deviations of stock gauge greater than —D, switch 7 closes to energize solenoid 9 and thereby close switch 9a, energizing the screw-down motor 30 to open the nip of calender rolls 31, switch 8 remaining open. In either case, the nip correction continues to be made until the indicated stock gauge deviation comes within the limits ±D, whereupon the closed switch (i.e. 7 or 8) opens, and the nip-adjusting mechanism stops until the indicated gauge deviation again exceeds the tolerance limits.

The FIG. 1 embodiment has limitations as regards the speed with which gauge corrections can be made and/or the closeness of the tolerances to which deviations can be held. This is due to the fact that there is a time lag between the occurrence of a change in gauge at the calender nip, and its detection by the measuring instrument. To avoid overshooting and "hunting" in such a control system, the tolerance limits must be relatively broad, and/or the rate of correction of the nip must be relatively slow. Both of these factors are undesirable from the view point of close, rapid-control. The disadvantage is greater, the greater the distance from calender nip to measuring gauge.

The FIG. 2 embodiment which may be called an intermittent error sampling system, provides a considerable improvement over that shown in FIG. 1. In addition to components 1–10, 30, and 31 (which function as described for FIG. 1), the FIG. 2 device has a sampling switch 11 and a timer switch 12 in series in the electrical supply circuit; a high-impedance timer 13 which operates timer switch 12; and a high-impedance holding relay 14 which operates switch 15 shunting switch 11. The sampling switch 11 is normally open, and is momentarily closed at times separated by intervals long enough to ensure the completion of a correction cycle (as described in the following), and the detection of the corrected stock gauge by the calender gauge 1. The timer switch 12 is normally closed, and opens momentarily at a pre-set time interval after energization of timer 13 through either of low-impedance solenoids 9 and 10. Relay 14 is also energized through either of solenoids 9 and 10; it closes switch 15 and holds it closed until switch 12 opens, thus deenergizing relay 14.

The cycle of operations of the FIG. 2 device is as follows. With switch 12 closed, momentary closing of sampling switch 11 connects the device to the electrical supply. If both of switches 7' and 8' are open (i.e. the stock gauge is within the tolerance limits), no action of the nip-correcting mechanism results. If either of switches 7' or 8' is closed, the corresponding nip-correction solenoid (9 or 10 respectively) is energized; timer 13 and relay 14 are also energized through the closed switch 7' or 8' and the unenergized solenoid 10 or 9, respectively. The relay 14 closes holding switch 15. Timer 13 is set to open switch 12 momentarily (thereby de-energizing the system and allowing holding switch 15 to open) when a nip correction equal to +D (or —D) has been made. The system remains de-energized until the corrected stock gauge reaches the measuring instrument 1; thereafter the sampling switch 11 again closes momentarily, completing the cycle of operations. Sampling switch 11 is conveniently operated by a cam driven (through suitable gearing is necessary) by the calender roll drive; other means for operating switch 11 at the required time intervals will readily occur to those skilled in the art.

The FIG. 2 device, under favorable conditions, can hold the gauge of the stock within closer tolerances than the FIG. 1 device. There is now no limitation on the rate of operation of the nip-adjusting mechanism, since the extent of a correction is limited to ±D by the action of the timer 13. However, this latter limitation is an undesirable one when the gauge deviation is large, since it may necessitate several cycles of operation of the correction mechanism before correction is completed. The FIG. 2 device works best in cases when the stock gauge deviation builds up slowly and continuously. With sudden relatively large deviations, this system may take an undesirably long time to effect correction.

FIG. 3 represents an embodiment combining features of the FIG. 1 and 2 embodiments, which gives close control when the deviation is small, and rapid correction rates when the deviation is large. In this arrangement, switches 7' and 8' are set for close tolerance limits (say ±D), and switches 7 and 8 are set for wider tolerance limits (say ±3D). The manner of operation will be evident from the foregoing discussions of FIGS. 1 and 2. When the deviation is outside the limits ±3D, switches 7 and 7' (or 8 and 8') are closed, and the calender nip screw down mechanism operates continuously in the appropriate direction. When the deviation is within the limits ±3D, switches 7 and 8 remain open, and the system works as described for FIG. 2. The FIG. 3 embodiment is substantially the same as that described in my U.S. patent application Serial No. 811,397, filed May 6, 1959, now Patent No. 3,088,061, from column 7, line 71, to column 9, line 37 and in FIGS. 6 and 7, which will now be described herein with reference to FIGS. 3a and 3b.

Referring to FIG. 3a of the drawings, there is represented schematically a portion of a servomechanism for adjusting the nip of the calender rolls to maintain the thickness of the stock substantially constant. The output pressure of the thickness-indicating device or gauge 1 is connected to indicator I, to a recorder 96 of conventional construction for recording the variations of thickness of the stock, and to a differential pressure transmitter 97 of conventional construction. An adjustable source 97a of constant pressure equal to the output pressure of the thickness gauge corresponding to the desired stock thickness is also connected to the differential pressure transmitter 97, which thus develops an output pressure dependent upon the two pressures supplied to it, and hence representative of the deviation of the actual stock thickness from the desired stock thickness. The output line of the differential pressure transmitter is connected to four pressure-actuated switches 101, 102, 103, 104 which start and stop the calender roll screw-down motor 116 (shown diagrammatically in FIGURE 3b), and which operate and are actuated in a manner to be described presently.

The action of the differential pressure transmitter 97 is such that, when the stock has the desired thickness, the output pressure of 97 has a definite value; and when the stock thickness is greater (or less) than desired, the output pressure of 97 is respectively less (or greater) than this definite value by an amount which is larger, the larger the deviation of the stock thickness. For definiteness in this discussion, the following typical values will be used for the relationship between stock thickness and output pressure of 97:

| Stock thickness deviation (mils) | −2 | −0.75 | 0 | +0.75 | +2 |
|---|---|---|---|---|---|
| Output pressure of 97 (p.s.i.) | 11 | 9.75 | 9 | 8.25 | 7 |

The four pressure-actuated switches are then chosen and adjusted to open and close, when the applied pressure changes, in accordance with the following schedule:

Switch 101—open below 9.75 p.s.i.; closed above 9.75 p.s.i.
Switch 102—open above 8.25 p.s.i.; closed below 8.25 p.s.i.
Switch 103—open below 11 p.s.i.; closed above 11 p.s.i.
Switch 104—open above 7 p.s.i.; closed below 7 p.s.i.

Comparison of this schedule with the output pressure vs. stock thickness relationship will show that for stock thickness deviations of 0.75 mil or less, all the switches are open. For stock thickness deviations between 0.75 and 2 mils, switch 102 only is closed if the deviation is positive, switch 101 only is closed if the deviation is negative. For deviations of more than 2 mils, switches 102 and 104 are closed with positive deviations, switches 101 and 103 with negative deviations. These switches are connected in a circuit shown in FIG. 3b which operates to energize the screw-down motor 116 in a suitable direction and at a suitable rate to correct the stock thickness.

In FIG. 3b, lines 108 and 110 carry the line voltage; 106 is a relay which, when energized, closes contacts 106c which energize the screw-down motor 116 so as to reduce the calender roll spacing; 106 also opens normally closed switch 106a and closes normally open switch 106b. Relay 109, when energized, closes contacts 109c which energize the screw-down motor 116 so as to increase the calender roll spacing; 109 also opens normally closed switch 109a, and closes normally open switch 109b. Switch 107, normally open, is closed for a short time periodically (e.g. once each revolution of the calender roll) by a suitable mechanical arrangement. Switch 105a, normally closed, is open by time delay relay 105 at a predetermined and adjustable time interval after 105 is energized. Switch 113 connects either the automatic control system at terminal 114 or the manual control system at terminal 115 as desired, and push-button switches 111 and 112 are provided for manual operation of the screw-down motor.

It is evident that the automatic control system functions as follows. If the stock thickness deviation is less than 0.75 mil, switches 101, 102, 103, and 104 are open, and the screw-down motor remains stationary. If the deviation is greater than 2 mils, switches 102 and 104 close for positive deviations, and switches 101 and 103 close for negative deviations, the other two switches in each case remaining open; the screw-down motor operates continuously in the proper direction to correct the deviation. For deviations between 0.75 and 2 mils, either switch 102 (positive deviations) or switch 101 (negative deviations) is closed, the other three pressure-operated switches remaining open. The corresponding relay 106 or 109 is energized only intermittently, when switch 107 momentarily closes, and the relay remains energized (through the holding action of relay 106b or 109b) only until time delay relay 105 opens switch 105a. Thus the screw-down motor operates to correct the deviation only periodically and intermittently, for periods of time determined by the setting of the time delay relay 105. (In the case under discussion, 105 would be set to give about 0.6 mil correction in the stock thickness.) Switches 106a and 109a insure against energizing both relays 106 and 109 at the same time. Switches 106b and 109b energize 105 at the proper time.

The above-described system for calender stock thickness control combines rapid correction of large deviations with freedom from over-shooting and "hunting" in correcting small deviations. Using this system, it has been possible to hold the gauge of calendered stock within tolerances of plus or minus 1 mil.

The FIG. 2 device has the limitation that the magnitude of the calender nip correction made is always the same, being determined by the setting of the timer 13.

If the correction made were proportional to the existing gauge deviation, closer tolerance limits could be used. This is accomplished by the embodiment shown in FIG. 4.

In the FIG. 4 embodiment, components 1–10, 30, and 31 inclusive are identical with the corresponding numbered components in FIGS. 1–3, and function as previously described. The pneumatic system comprises a storage volume 16 connected with switches 7' and 8'; a source 19 of constant pneumatic pressure connecting with a flow resistance 18; and a two-way valve 17 actuated by a solenoid 22 and adapted to connect switches 7', 8' and volume 16 alternatively with the outlet 6 of the differential pressure transmitter 3, or with constant pressure source 19 through flow resistance 18. The pressure in 19 is maintained equal to that output pressure of differential pressure transmitter 3 which corresponds to the desired stock gauge. The electrical system comprises a high impedance relay 20, energized when either of switches 7' and 8' is closed, closing switch 21 on contact 21a when 20 is not energized, and on contact 21b when 20 is energized; a relay 23 which when energized closes holding switch 24 and switch 25; a timer 26 which momentarily opens switch 27 at a predetermined time after timer 26 is energized; and the solenoid 22, which operates valve 17 to connect storage volume 16 with outlet 6 when 22 is not energized, and with pressure source 19 through flow resistance 18 when 22 is energized.

FIG. 4 shows the control system in a "waiting" condition, such as exists when the stock gauge is within the tolerance limits; switches 7', 8', 21b, 24, and 25 are open, switches 27 and 21a are closed, and storage volume 16 is connected to outlet 6. When the stock gauge deviation exceeds the tolerance limits, switch 7' (or switch 8') closes, thereby starting the nip-adjusting mechanism, and energizing relay 20 to open switch 21a and close switch 21b. Thus relay 23 is energized to close switches 24 and 25, and solenoid 22 is energized to operate valve 17 and connect volume 16 with pressure source 19 through restriction 18. Pressure equalization between volume 16-switch 7'-switch 8' and source 19 starts due to flow of air through restriction 18. When the pressure in volume 16-switch 7'-switch 8' comes within the tolerance limits, switch 7' (or switch 8') opens, stopping the nip-adjusting mechanism and deenergizing relay 20. The time during which the nip-adjusting mechanism is energized is approximately proportional to the initial pressure difference between volume 16 and source 19. Hence, with suitably chosen values of the volume 16 and the flow resistance 18, the nip correction is substantially equal to the initial gauge deviation. De-energizing relay 20 opens switch 21b and closes switch 21a; solenoid 22 and relay 23 remain energized, due to the holding action of switch 24; volume 16 remains connected to source 19 through valve 17, and the timer 26 is energized via switches 21a and 25. After timer 26 has run for the predetermined length of time required for the gauge correction in the calendered sheet to reach the gauge, the timer momentarily opens switch 27; relay 23 and solenoid 22 are deenergized, and the system reverts to the "waiting" condition, in readiness to make the next correction.

The FIG. 4 embodiment has been found highly effective in controlling the gauge of sheet stock from a calender. Independent control of the nip at the right and left sides of the calender may be provided by two separate control systems acting on the right and left calender roll bearings respectively. The timer 26 may, if desired, comprise a magnetic clutch geared to the calender roll so that the switch 27 will be opened after the calender roll has rotated a predetermined distance after the clutch is energized. In this manner the system is prevented from reverting to the "waiting" condition during the period required for the stock to move from the nip to the gauge, regardless of the speed of the calender.

The application of this invention to equipment, other than calenders, for producing continuous lengths of plastic material is obvious. Thus in the case of an extruder producing a shaped strip (for example, a tire tread), the adjusting mechanism governed by the pneumatic gauge may be adapted to change the size or shape of the extruder nozzle, thus correcting for any deviation in gauge.

In the case of a sheet produced by spreading a liquid on a moving surface and solidifying the resulting liquid sheet by drying or other means, the gauge of the sheet after solidifying may be measured by the pneumatic gauge, and the automatically controlled adjusting mechanism may be adapted to govern the position of the spreader bar or other element which determines the thickness of the liquid layer.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. Apparatus for automatically controlling a dimension of a plastic material produced in continuous lengths comprising: gauging means for developing a pneumatic pressure representative of said dimension of said material; means for supplying a pneumatic pressure representative of the desired value of said dimension, a differential pressure transmitter actuated by said pressures for developing an output pressure representative of the deviation of value of said dimension from said desired value; a source of pressure having a value equal to said output pressure when said deviation is zero; a restriction communicating with said source of pressure; a reservoir; a valve adapted to provide communication alternatively between said reservoir and the outlet of said differential pressure transmitter or between said source of pressure and said reservoir through said restriction; electrically energized motor means for adjusting said dimension of said material; and an electrical circuit, comprising a plurality of pressure-operated switches communicating with said reservoir, for energizing said motor means when said output pressure exceeds predetermined tolerance limits and for causing said valve to provide communication between said pressure-operated switches and said source when said output pressure exceeds said tolerance limits, whereby the pressure at said switches approaches the pressure of said source over a period of time and said motor means is de-energized after a period of time approximately proportional to the deviation of the value of said dimension from said desired value.

2. Apparatus for automatically controlling a dimenison of a plastic material produced by a machine in continuous lengths comprising: electrically energized motor means for adjusting said machine to correct a deviation of said dimension from the desired dimension of said material; an electrical circuit comprising first and second pneumatic-pressure-operated switches for energizing said motor means to correct positive and negative deviations respectively; a gas reservoir pneumatically connected with said pneumatic-pressure-operated switches; means for providing a first pneumatic pressure representative of the magnitude and the sense of said deviation; means for providing a second pneumatic pressure representative of zero magnitude of said deviation; a flow resistance member; and a two-way valve adapted to connect said reservoir either with said means for providing said first pneumatic pressure, or through said flow resistance member with said means for providing said second pneumatic pressure; said electrical circuit being adapted (1) to maintain said reservoir in connection with means for providing said first pneumatic pressure until said deviation exceeds a predetermined magnitude, (2) thereupon to energize said motor means through one of said pneumaticpressure-operated switches and simultaneously to actuate said valve to connect said reservoir through said flow-resistance member with said means for providing said second pneumatic pressure, (3) to maintain said reservoir in connection with said means for providing said second pneumatic pressure for a period of time sufficient for said motor means to adjust said machine to correct said deviation and for a predetermined period of time thereafter, and (4) thereupon to actuate said valve to connect said reservoir with said means for providing said first pneumatic pressure.

3. Apparatus as in claim 2, wherein said means for providing said first pneumatic pressure comprises gauging means for developing a pneumatic pressure representative of said dimension of said material, means for supplying a pneumatic pressure representative of the desired value of said dimension, and a differential pressure transmitter actuated by the two last-mentioned pneumatic pressures and having an output pressure representative of the magnitude and the sense of said deviation.

No references cited.